Figure 1:
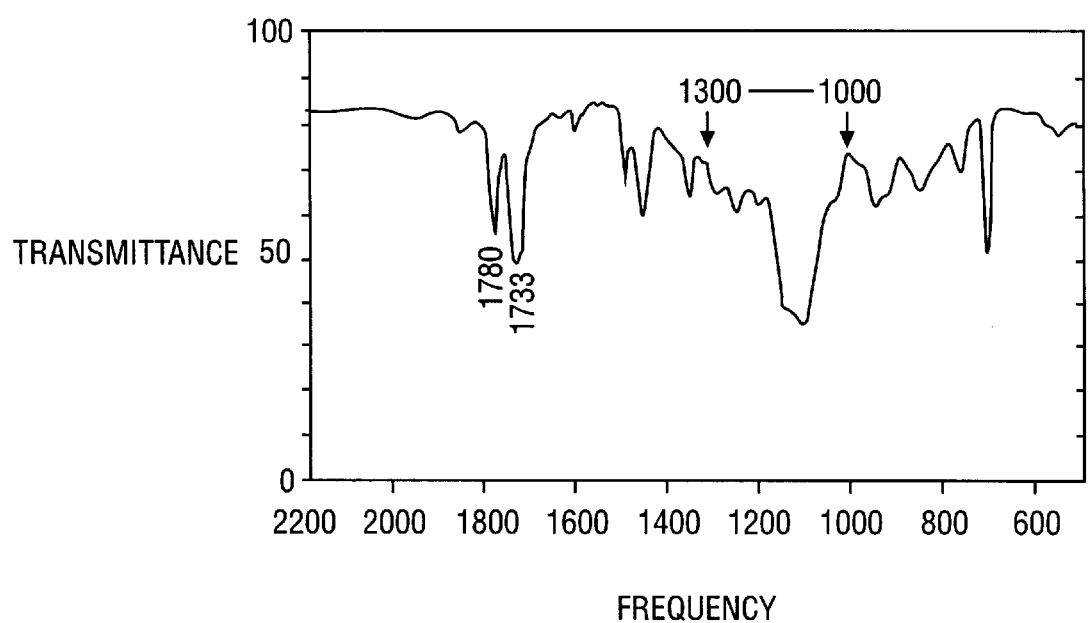

United States Patent [19]
Kim et al.

[11] Patent Number: 6,123,875
[45] Date of Patent: Sep. 26, 2000

[54] PROCESS FOR PRODUCING A RUBBER ELASTIC COPOLYMER, AN ION-CONDUCTING THIN MEMBRANE COMPOSITION CONTAINING THE COPOLYMER, AN ION-CONDUCTING THIN MEMBRANE AND A PROCESS FOR PRODUCING THE SAME, AND A SOLID ELECTROCHEMICAL MATERIAL CONTAINING THE MEMBRANE

[75] Inventors: Eun Kyoung Kim; Wee Jin; Suh Bong Rhee; Chang Jin Lee, all of Taejeon, Rep. of Korea

[73] Assignee: Korea Research Institute of Chemical Technology, Rep. of Korea

[21] Appl. No.: 09/122,668

[22] Filed: Jul. 24, 1998

[51] Int. Cl.$^7$ ........................................... H01B 1/06
[52] U.S. Cl. .................. 252/518.1; 252/500; 252/519.3; 204/281; 204/290 R; 204/291; 521/25
[58] Field of Search ..................................... 252/500, 511, 252/519.33, 519.34, 521.6, 518.1, 519.3; 204/281, 282, 290 R, 291; 521/25

[56] References Cited

U.S. PATENT DOCUMENTS 4,654,279  3/1987  Bauer et al. .............................. 429/192

OTHER PUBLICATIONS

Reitman et al., J. Polym. Sci., Part C: Polymer Lett. 28. 187 (1990), Nov. 1989.

*Primary Examiner*—Yogendra Gupta
*Assistant Examiner*—D G Hamlin
*Attorney, Agent, or Firm*—Blakely, Sokoloff, Taylor & Zafman LLP

[57] ABSTRACT

The present invention relates to a process for producing a styrene-maleic acid polyethyleneoxy ester copolymer from compositions comprising a styrene-maleic anhydride copolymer, polyethyleneglycol and polyethyleneglycol monoalkyl ether (in a weight ratio of from 0 to 100% relative to the polythyleneglycol), the copolymer produced therefrom, an ion-conducting thin membrane composition produced with an electrolytic salt, an ion-conducting thin membrane containing the copolymer and a process for producing the same, a solid electrochemical material containing the copolymer. The copolymer according the present invention has a high solubility in organic solvent, a good rubber elasticity. The ion-conducting thin membrane comprising this copolymer and an electrolytic salt as major components has an excellent mechanical property, a high adhesive strength and a high ion conductivity at room temperature.

9 Claims, 2 Drawing Sheets

PROCESS FOR PRODUCING A RUBBER
ELASTIC COPOLYMER, AN ION-
CONDUCTING THIN MEMBRANE
COMPOSITION CONTAINING THE
COPOLYMER, AN ION-CONDUCTING THIN
MEMBRANE AND A PROCESS FOR
PRODUCING THE SAME, AND A SOLID
ELECTROCHEMICAL MATERIAL
CONTAINING THE MEMBRANE

TECHNICAL FIELD

The present invention relates to a process for producing a rubber elastic copolymer, a composition for an ion-conducting thin membrane containing the copolymer, a solid electrochemical material containing the membrane.

More particularly, the present invention relates to a styrene-maleic acid polyethyleneoxy ester copolymer, a process for producing the copolymer, an ion-conducting thin membrane composition containing the copolymer and an electrolytic salt, an ion-conducting thin membrane produced from the copolymer or the ion-conducting thin membrane composition, a process for producing the membrane and a solid electrochemical material containing the copolymer.

BACKGROUND OF THE INVENTION

When compared to an electrochemical device using conventional liquid electrolyte, electrochemical device using solid electrolyte has such advantages as having no solution leakage problem, and is processable into thin membranes and small sizes, thus it can be easily utilized in portable electronic devices and automobiles, etc.

Especially, a solid polymeric electrolyte thin membrane has been extensively studied and developed because it provides a chemical battery with high charging-discharging efficiency. Further chemical batteries made of such material may have various types and are lightweight.

For the production of a solid-type chemical battery of the above merits, currently polymeric compounds have been developed so as to be used as electrolytes, since polymers can be processed into thin membranes, can be used as an electrolyte due to their salt-dissolving property and ion permeability. When processed into the solid electrolyte, other advantages such as low battery resistance and high current flow even at low current distribution are also provided.

As described above, even though the polymeric ion-conducting thin membrane applicable for solid chemical battery has a good ion conductivity and mechanical property, it is difficult to improve both properties only by changing the physical properties such as the molecular weight of the polymer matrix and its glass transition temperature. Hence, it is required to develop a novel polymeric electrolyte having both improved physical property and ion conductivity.

In the U.S. Pat. No. 4,654,279, Baueretal. disclosed a battery using double network of a conducting liquid polymer, which has both a mechanical substrate consisting of a continuous network of a crosslinked polymer for improving the mechanical property of the solid electrolyte and two kinds of continuous phases consisting of an ion conducting phase providing the channel of ion transport through the matrix.

Le Mehaute et al. disclosed a solid electrolyte for an electrochemical material containing one or more polymers forming a complex and one or more ionizable alkali salt chelated with the above polymer. A process to produce the above solid electrolyte was disclosed which is characterized in that the above polymer forming complex was mixed to an amorphous state in a crosslinking process.

Xia et al. disclosed with regard to heat and ion conductability of a polymer ion electrolyte prepared by polymerization of oligoethyleneoxy methyl methacrylate (Solid state Ionics, 1984, 14, 221~224). However, as it is difficult to prepare a complete non-crystalline (amorphous) thin membrane from the polymer electrolyte of the above invention, the ion conductivity of the polymer membrane prepared varies greatly depending on its temperature. The ion conductivity at room temperature also changes with time; hence one has problems in applying it as material to practical use. The main chain of the polymer consists of only ethyleneoxy methyl methacrylate unit and thus the hardness of the membrane of the polymer polymerized is so large that it has a poor ion conductivity. Since the electrolyte membrane is brittle due to its poor mechanical property, one has difficulties in using the membrane for batteries or solid electrochemical materials. This is because the polymer electrolyte prepared by the above invention has low ion conductivity (less than $1 \times 10^{-5}$ S/cm) and low adhesive strength for an electrode, when applying the electrolyte to a solid electrochemical device, one is faced with problems such as cracking of the electrolyte membrane and short life of the electrolyte membrane, etc., which are factors that would eventually shorten the life of the electrochemical device. Thus, there has been a need to develop a styrene-maleic acid polymer electrolyte having an excellent mechanical property and a rubber elasticity.

For example, Mellander et al. suggested a process to produce a solid electrolyte using a styrene-maleic acid polyethyleneoxy ester copolymer produced from compositions comprising styrene-maleic anhydride copolymer, polyethyleneglycol methyl ether and KOH as major components (Electrochimica Acta, 1995, vol. 40, 2413–2416). The polymer produced by the above invention has a solution processability, an excellent elasticity, but a very low ion conductivity (ion conductivity below $10^{-6}$ S/cm at room temperature). This is because the copolymer is produced as a type of union conductor using KOH, one is faced with a limitation when using this conducting thin membrane as a practical solid electrochemical material such as a lithium ion battery, etc. in practice.

Florianczyk et al. suggested a process to produce an electrolyte from compositions comprising styrene-maleic anhydride copolymer, polyethyleneglycol methyl ether and NaI as major components (Synthetic metals, 1990, 35, 249.). This electrolyte has also a solution processability and an excellent elasticity, but a very low ion conductivity (ion conductivity below $10^{-10}$ S/cm at room temperature) because it is produced as a type of union conductor using NaI. Thus, when using this conducting thin membrane as a practical solid electrochemical material such as a lithium ion battery, etc. in practice, one is faced with limitations.

Rietman and his collaborators suggested a process to produce an electrolyte from compositions comprising styrene-maleic anhydride copolymer, polyethyleneglycol methyl ether and lithium salt as major components (J. Polym. Sci., Part C: Polymer Lett. 1990. 28. 187). However, this electrolyte has also a very low ion conductivity (ion conductivity below $10^{-7}$ S/cm at room temperature) because it is produced as a type of union conductor. In addition, this electrolyte has a poor mechanical property.

DISCLOSURE OF THE INVENTION

To solve these problems, the inventors of the present invention developed a process to produce a styrene-maleic acid polyethyleneoxy ester copolymer with both rubber elasticity and ion conductibility after an intensive research on polymers having both rubber elasticity and ion conductibility, especially polyethyleneoxy-substituted rubber elastic polymers.

Further, the inventors of the present invention found that styrene-maleic acid polyethyleneoxy ester copolymers are soluble in general organic solvents and can be mixed well with an electrolytic salt, thus they can be prepared and processed into ion-conducting thin membranes by a solution casting method. Said polymer has an excellent mechanical property, adhesive strength, solution processability and rubber elastic property, and is produced from compositions comprising a styrene-maleic anhydride polymer (purchased or prepared from a known method: M. Ratzsch, Prog. Polym. sci., 1988, vol 13, 277–337), polyethyleneglycol and/or polyethyleneglycol monoalkyl ether as major components. Moreover, from such copolymers, a solid electrolyte membrane with an improved mechanical property and adhesive strength together with an enhanced ion conductivity at room temperature of above $10^{-4}$ S/cm can be made.

It has been found that the polymer electrolyte membrane can be detached as a free standing film after the production process and applied to a solid electrochemical material because of its excellent adhesive strength even after repeated uses.

Based on the above findings, the inventors of the present invention developed a process for producing a copolymer having both rubber elasticity and ion conductibility from compositions comprising a styrene-maleic anhydride, polyethyleneglycol and/or polyethyleneglycol monoalkyl ether, a process for producing an ion-conducting polymer thin membrane which has a high ion-conducting property at room temperature.

Therefore, a first object of the present invention is to provide a process for producing a styrene-maleic acid polyethyleneoxy ester copolymer of a molecular weight of from 1,200 to 500,000 having a general formula (1). Said copolymer is prepared by a reaction of a mixture including styrene-maleic anhydride polymer of a number average molecular weight of from 1,000 to 100,000, polyethyleneglycol of a molecular weight of from 200 to 5,000 and polyethyleneglycol monoalkyl ether of a molecular weight of from 200 to 5,000 (in a weight ratio of from 0 to 100% relative to the polyethyleneglycol) in the presence or absence of a solvent.

[chemical formula 1]

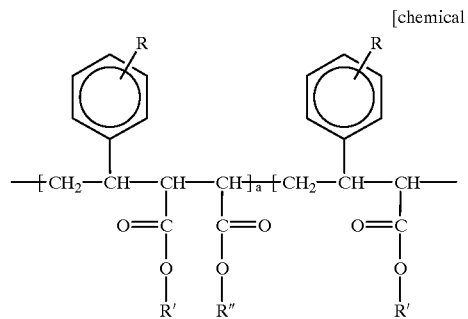

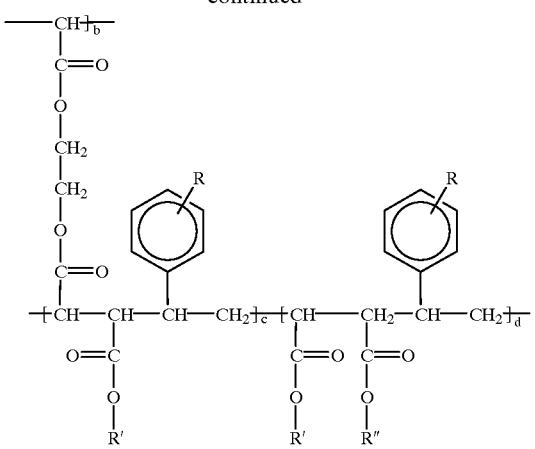

In the above formula (1), R represents hydrogen, a lower alkyl group having no more than 10 carbon atoms including methyl, ethyl, propyl, etc., or a phenyl group; a, b, c, d has the value of from 0 to 1 where a+b+c+d=1, and R' may be R or R" where R" represents a polyalkyleneoxy alkyl ether of formula (2) wherein n is an integer of 1 to 20 and R is the same as defined above.

[chemical formula 2]

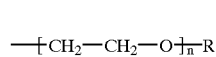

As the styrene-maleic anhydride polymer of the present invention, a commercially available material (purchasable from Aldrich Co.) may be used or it may be prepared from a known method (for instance, as described in Prog. Polym. Sci., 1988, vol. 13, 277–337, by M. Ratzsch)

A second object of the present invention is to provide a composition for an ion-conducting thin membrane comprising 1 to 50% by weight, preferably 5 to 40% by weight of the styrene-maleic acid polyethyleneoxy ester copolymer of the formula (1) as prepared above, 1 to 50% by weight, preferably 5 to 40% by weight of an electrolytic salt of a general chemical formula (3) and 50 to 98% by weight, preferably 60 to 95% by weight of known organic solvent, such as acetonitrile, propylene carbonate, dimethoxy ethane, tetrahydrofuran, etc.

$A^+B^-$ [chemical formula 3]

In the above formula (3), $A^+$ represents cations, such as Li, Na, etc. and $B^-$ represents anions, such as $ClO_4^-$, $CF_3SO^-_3$, $N(CF_3SO_3)_2^-$, $BF_4^-$, $PF_6^-$, $AsF_6^-$, etc.

Further, a third object of the present invention is to provide an ion-conducting thin membrane of ion conductivity of $10^{-2}$~$10^{-8}$ S/cm, which is prepared by coating the above composition by a solution processing step, such as spin coating, casting, dip coating or bar coating, etc. and then evaporating the solvent.

Still further, a fourth object of the present invention is to provide an ion-conducting membrane, which is prepared by mixing 10 to 80% by weight, preferably 20 to 70%, more preferably 30 to 60% of the styrene-maleic anhydride copolymer, 10 to 80% by weight, preferably 20 to 70%, more preferably 30 to 60% by weight of the polyethyleneglycol of the molecular weight of 200 to 5000 and 10 to 80% by weight, preferably 20 to 70% by weight, more preferably 30 to 60% by weight of the electrolytic salt of formula 3 and heat-curing under nitrogen stream.

Still further, a fifth object of the present invention is to provide a process for producing an ion-conducting thin membrane, characterized in that the styrene-maleic anhydride polymer (10 to 80% by weight, preferably 20 to 70%, more preferably 30 to 60%), the polyethyleneglycol of the molecular weight of 200 to 5000 (10 to 80% by weight, preferably 20 to 70%, more preferably 30 to 60%) and the electrolytic salt of formula (3) (10 to 80% by weight, preferably 20 to 70%, more preferably 30 to 60%) are mixed in the presence or absence of a solvent, and then are subjected to a heat-curing and/or evaporating step under nitrogen stream.

In this process to produce the ion-conducting thin membrane, the solvent may be chosen from organic solvents generally used in this industry, suchasacetonitrile, propylene carbonate, dimethoxyethane, tetrahydrofuran, etc., and the amount of the solvent to be added is 1 to 70%.

A sixth object of the present invention is to provide a solid electrochemical material which comprises the copolymer of the formula (1) and/or an electrolytic salt chosen from the group consisting of compounds of formula (3).

In order to achieve the above objects, the present invention is described in detail.

According to the present invention, as one process for producing the styrene-maleic acid polyethyleneoxy ester copolymer, the styrene-maleic anhydride polymer is dissolved in the polyethyleneglycol and/or polyethyleneglycol monoalkyl ether (in a weight ratio of from 0 to 100% relative to polythyleneglycol) in the absence of the solvent, and thereafter mixed and heated under an inert gas, such as nitrogen, argon, etc., preferably nitrogen gas, at a temperature of 60 to 140° C., preferably 80 to 125° C. and more preferably 100 to 120° C., for 1 to 30 hours, preferably 1 to 25 hours, more preferably 2 to 20 hours.

As another process for producing the styrene-maleic acid polyethyleneoxy ester copolymer, the styrene-maleic anhydride polymer and polyethyleneglycol and/or polyethyleneglycol monoalkyl ether are dissolved in toluene or other solvents of high boiling point, and thereafter mixed and heated under nitrogen gas, at a temperature of 60 to 140° C., preferably 80 to 125° C. and more preferably 100 to 120° C., for 1 to 30 hours, preferably 1 to 25 hours, more preferably 2 to 20 hours.

To promote the above reactions, catalysts such as pyridine, 4-(N,N-dimethylamino)pyridine, cobalt dichloride, etc. can be used for the above composition for producing the styrene-maleic acid polyethyleneoxy ester copolymer.

In the process for producing the styrene-maleic acid polyethyleneoxy ester copolymer of the present invention, after the styrene-maleic anhydride polymer and polyethyleneglycol and/or polyethyleneglycol monoalkyl ether are reacted in the absence of a solvent or dissolved in a solvent of high boiling point and reacted as the above method, a lower alcohol, such as methanol, ethanol, etc. is added to the mixture and then the mixture is heated to produce the styrene-maleic acid polyethyleneoxy ester copolymer.

The styrene-maleic acid polyethyleneoxy ester copolymer produced according to the present invention has a molecular weight of 1200 to 500,000 and a high solubility in general organic solvents such as acetone, acetonitrile, alcohol, propylene carbonate, tetrahydrofuran, etc.

The present invention also provides an ion-conducting thin membrane composition prepared by mixing 1 to 50 by weight, preferably 5 to 40% by weight of the styrene-maleic acid polyethyleneoxy ester copolymer of the formula (1), 1 to 50% by weight, preferably 5 to 40% by weight of a electrolytic salt of the formula (3) and 50 to 98% by weight, preferably 60 to 95% by weight of an organic solvent chosen from acetonitrile, propylene carbonate, dimethoxy ethane, tetrahydrofuran, etc.

The ion-conducting thin membrane composition of the present invention, which is prepared by dissolving the styrene-maleic acid polyethyleneoxy ester copolymer in acetonitrile or a general organic solvent and mixing it with one or more of known electrolytic salts of the above formula (3), is applied on an electrode. The solvent is then evaporated to produce the ion-conducting thin membrane of the present invention.

The ion-conducting thin membrane of the present invention may also be produced by mixing the above composition consisting of the styrene-maleic anhydride polymer and polyethyleneglycol and/or polyethyleneglycol monoalkyl ether with one or more of known electrolytic salts of formula (3) and applying it on an electrode, and then being heated.

In the reaction of the styrene-maleic anhydride polymer and the polyethyleneglycol of the present invention, the polyethyleneglycol reacts with the styrene-maleic anhydride to be substituted at a side branch of the styrene-maleic anhydride polymer or to be cross-linked by substitution at a side branch of another styrene-maleic anhydride polymer. The polyethyleneglycol monoalkyl ether reacts with the styrene-maleic anhydride to be substituted at a side branch of the styrene-maleic anhydride polymer. The above polymer gives an ion-conducting property by forming a complex by a coordinate bonding, etc., with the cation of the electrolytic salt. The part of allyl or alkylallyl, as in the styrene, keeps the mechanical property. In the above polymerization, the polyethyleneglycol reacts with the styrene-maleic anhydride to form a cross-linking network, thus improves the mechanical property of the ion-conducting membrane. The polyethyleneglycol ether reacts with the styrene-maleic anhydride to be a substituted at a side branch, which improves the ion-conducting property. That is, those reactions of the polyethyleneglycol and the polyethyleneglycol ether give the mechanical property and the ion-conducting property of the present invention. These polyethyleneglycol and polyethyleneglycol ether are used in an amount which is the same or 1 to 10 times of that of the styrene-maleic anhydride polymer. In case where the amount of the polyethyleneglycol and polyethyleneglycol ether used exceeds the above range, the produced copolymer product would be difficult to be separated after the reaction. On the contrary, in case where less than an equal amount of the polyethyleneglycol and polyethyleneglycol ether relative to that of the styrene-maleic anhydride is used, it would not be easy to achieve the polymerization.

The styrene-maleic acid polyethyleneoxy ester copolymer of the present invention is very soluble in general solvents such as acetonitrile, propylene carbonate, acetone, alcohol, tetrahydrofuran, etc., and becomes a composition for an ion-conducting membrane when mixed with the electrolytic salt. The amount of the electrolytic salt (alkali salt) used is 0.001 to 20 times by weight, preferably 0.01 to 10 times by weight, relative to the styrene-maleic acid polyethyleneoxy ester copolymer. In case the amount of the alkali salt is smaller or larger than the above range, the ion conductivity decreases due to crystallization. With the above composition of the present invention, other polymer electrolytes such as polyethylene oxide, polyvinylidene fluoride can be mixed together to produce a ion-conducting polymer. In the above composition of the present invention, various kinds of additives and/or fillers such as antioxidant, dye and pigment, lubricant, viscosity builder, which is generally used in this industry, can be added to improve its heat resistance, its mechanical property or its processing property. Furthermore, the ion-conducting thin membrane composition and ion-conducting thin membrane, prepared according to the present invention, may additionally contain one or more of the material chosen from the group consisting of carbon black, natural graphite and artificial graphite, etc. Optionally, one or more of the compounds chosen from the group consisting of carbon black, ethylene-propylene-diene rubber (EPDM) and polyvinylidene fluoride (PVdF) may also be added in the ion-conducting thin membrane composition and the ion-conducting thin membrane of the present invention.

After being applied to an electrode and dried, the ion-conducting thin membrane composition provides a polymeric electrolytic membrane having an excellent mechanical property, being in a complete amorphous state at room temperature, and having an ion conductivity of $1 \times 10^{-4}$ S/cm to $7 \times 10^{-4}$ S/cm, and about $4 \times 10^{-4}$ S/cm generally at room temperature. If the mixture of the styrene-maleic anhydride, polyethyleneglycol and electrolytic salt, is directly applied on an electrode, and thereafter is subjected to heat treatment, a polymeric electrolytic membrane is obtained which has an excellent mechanical property and is in a complete amorphous state at room temperature having an ion conductivity of above $4 \times 10^{-6}$ S/cm, preferably above $5 \times 10^{-6}$ S/cm, more preferably above $6 \times 10^{-6}$ S/cm, at room temperature.

The polymeric electrolytic membrane of the present invention can be prepared from the ion-conducting membrane composition by a solution coating method, and thus the preparation process thereof is simplified because a general solution casting method can be used. Furthermore, since one can produce an ion-conducting thin membrane having an excellent adhesive strength and high ion conductivity property at room temperature in forms from a gel state to a solid by controlling the length and end group of the polyoxyethylene, ion-conducting membrane which are applicable to most electrochemical devices such as battery, sensor, electric color-changing device, etc., can be produced.

mixed with 36 g of the styrene-maleic anhydride polymer (molecular weight: 1900, manufacturer: Aldrich co., styrene/maleic anhydride=2.47/1). The mixture was heated while being stirred at a temperature of 120° C. under nitrogen stream. After 20 hours, the reaction mixture was cooled down to room temperature, and a large quantity of the polyethyleneglycol monomethyl ether was extracted by washing the reaction mixture with 50 mL of acetone of and 50 mL of hexane. 42 g of colorless styrene-maleic acid polyethyleneoxy ester copolymer (number-average molecular weight: 45,600 with reference to polystyrene) was obtained after repeatedly washing the reaction mixture in this manner for more than 10 times and evaporating under a reduced pressure the acetone and hexane added.

Elemental analysis: C(%), 63.35; H(%), 8.17; O(%), 27.49.

Figure 2:
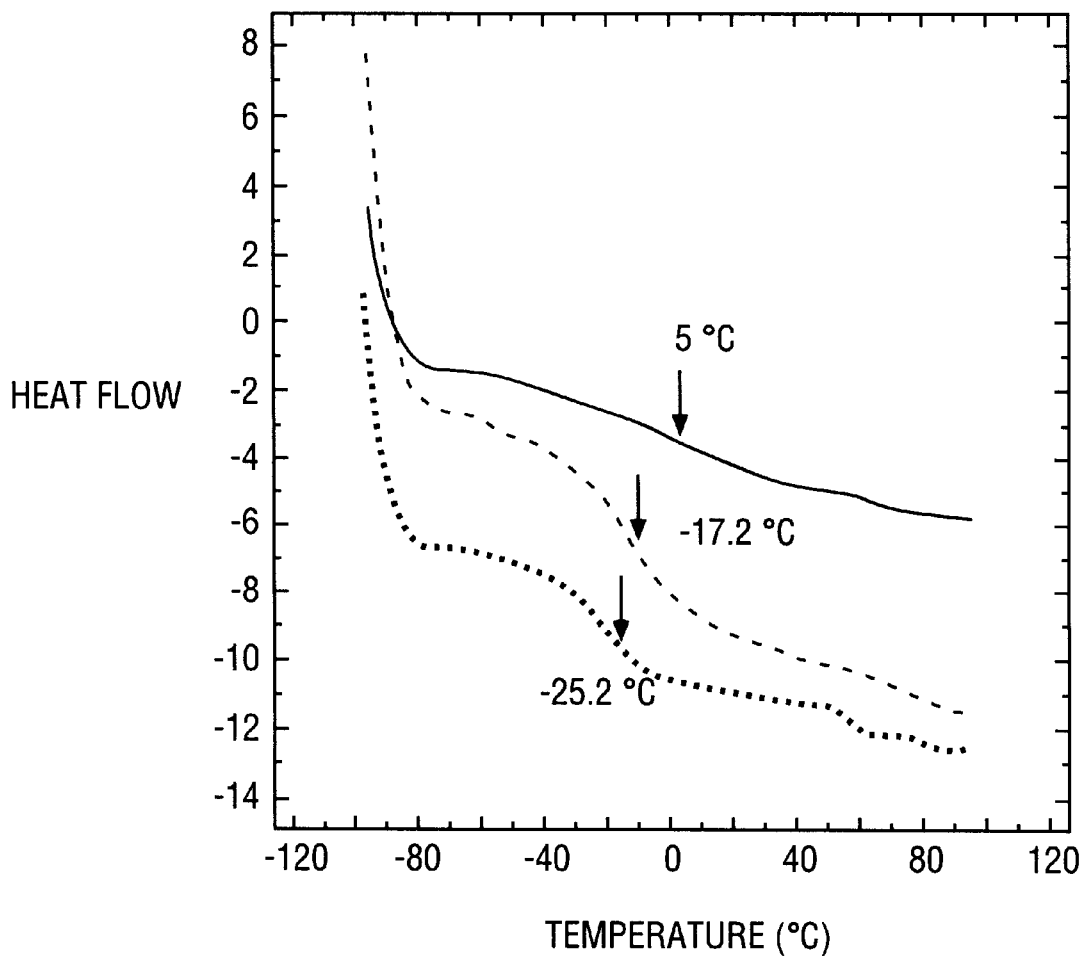

An infrared analysis result of the polymer prepared is shown in FIG. 1. Said analysis indicates that the maleic anhydride group of the styrene-maleic anhydride polymer, a reactant in the copolymer of the present invention is completely substituted to be maleic ester by the polyethyleneglycol monomethyl ether. A thermal analysis diagram of the polymer prepared is shown in FIG. 2. It shows that the copolymer of the present invention has a glass transition temperature of −26.2° C. and thus has rubber elastic property and is completely amorphous at room temperature.

EXAMPLES 2 TO 10

The copolymer was prepared in the same manner as in the Example 1. The amount of reaction component used in Examples 2–10 respectively are shown in table 1 below. The elemental analysis, glass transition temperature and yield of the prepared polymer are described also in Table 1 below.

TABLE 1

| example | styrene-maleic anhydride polymer | | poly ethylene oxy glycol monomethyl ether | | reaction temp. | reaction time | elemental analysis result | | | glass transition temp.(Tg) | yield |
|---|---|---|---|---|---|---|---|---|---|---|---|
| | Mw | g | Mw | g | (° C.) | hour | C(%) | H(%) | O(%) | (° C.) | (g) |
| 2 | 1900 | 19 | 550 | 33 | 120 | 20 | 64.71 | 8.10 | 27.45 | 5 | 22 |
| 3 | 1900 | 19 | 350 | 19 | 120 | 20 | 68.20 | 7.89 | 24.93 | −17.2 | 20 |
| 4 | 1600 | 16 | 350 | 9.5 | 120 | 20 | 61.77 | 7.66 | 30.33 | −20.3 | 18 |
| 5 | 1600 | 16 | 550 | 15 | 120 | 20 | 58.52 | 8.03 | 32.12 | −23.8 | 19 |
| 6 | 1600 | 16 | 750 | 16 | 120 | 20 | 58.08 | 8.16 | 33.11 | −22.6 | 21 |
| 7 | 1600 | 16 | 750 | 7.5 | 120 | 20 | — | — | — | −22.1 | 10 |
| 8 | 1600 | 16 | 750 | 16 | 120 | 10 | — | — | — | −22.5 | 18 |
| 9 | 1600 | 16 | 750 | 15 | 80 | 20 | — | — | — | −23.0 | 19 |
| 10 | 1600 | 16 | 550 | 14 | 80 | 11 | — | — | — | −23.8 | 17 |

BEST MODE FOR CARRYING OUT THE INVENTION

Hereinafter, the present invention is explained in further detail with reference to Examples. However, it should be understood that the following examples are described to illustrate the present invention, not given to limit the present invention.

EXAMPLE 1

108 g of the polyethyleneglycol monomethyl ether (molecular weight: 750, manufacturer : Polyscience co.) was

EXAMPLE 11

116 g of the polyethyleneglycol monomethyl ether (molecular weight: 750, manufacturer : Polyscience co.) was mixed with 31 g of the styrene-maleic anhydride polymer (molecular weight: 1900, manufacturer: Aldrich co.). The mixture was mixed under heating at a temperature of 120° C. under nitrogen stream. After 20 hours, the reaction mixture was cooled down to room temperature, and a large quantity of the polyethyleneglycol monomethyl ether was extracted by washing the reaction mixture with 50 mL of acetone and 50 mL of hexane. After repeatly washing the reaction mixture more than 10 times and removing the acetone and hexane under a reduced pressure, colorless styrene-maleic acid polyethylene ester copolymer was obtained, which was then dissolved in a solvent methanol and was heated to 60° C. After 24 hours, 41 g of colorless styrene methyl ether maleic acid polyethyleneoxy ester copolymer was yielded by cooling the reactant down to room temperature and removing the solvent under a reduced pressure.

Elemental analysis: C(%), 64.65; H(%), 7.79; O(%), 26.30.

The glass transition temperature of the copolymer prepared is −16.3° C.

EXAMPLE 12

The reaction was carried out in the same manner as in Example 11 except that 30 g of styrene-maleic anhydride polymer (molecular weight: 1600) was used. 48 g of styrene methyl ether maleic acid polyethyleneoxy ester copolymer was obtained.

Elemental analysis: C(%), 58.89; H(%), 8.13; O(%), 32.57.

The glass transition temperature of the polymer prepared is −31.55° C.

EXAMPLE 13

35 g of the styrene-maleic anhydride polymer (molecular weight: 1600, manufacturer: Aldrich co.) was mixed with 196 g of polyethyleneglycol monomethyl ether (molecular weight: 550, manufacturer: Polyscience co.). The mixture was mixed with heating at a temperature of 120° C. under nitrogen stream. After 20 hours, the reaction mixture was cooled down to room temperature, and was then dissolved in methanol and heated to temperature of 60° C. After 24 hours, the reaction mixture was cooled down to room temperature, and the solvent was removed. A large quantity of the polyethyleneglycol monomethyl ether was extracted by adding 50 mL of acetone of and 50mL of hexane. After washing the reaction mixture more than 10 times and removing the acetone and hexane under a reduced pressure, colorless styrene-maleic acid polyethyleneoxy ester copolymer was heated to temperature of 60° C. After 24 hours, 74 g of the colorless styrene methyl ether maleic acid polyethyleneoxy ester copolymer was yielded by cooling the reactant down to room temperature and removing the solvent under a reduced pressure.

Elemental analysis: C(%), 59.57; H(%), 8.08; O(%), 32.01.

The glass transition temperature of the polymer prepared is −13.9° C.

EXAMPLE 14

The reaction was carried out in the same manner as in Example 13 except that 27 g of styrene-maleic anhydride polymer (number-average molecular weight: 13731, styrene/maleic anhydride=2.55/1) and 112 g of polyethyleneglycol monomethyl ether(molecular weight: 750) were used. 38 g of styrene methyl ether maleic acid polyethyleneoxy ester copolymer of the number-average molecular weight 24501 was obtained.

Elemental analysis: C(%), 65.38; H(%), 8.16; O(%), 26.46.

The glass transition temperature of the polymer prepared is −17.4° C.

EXAMPLE 15

1.8 g of the styrene-maleic anhydride polymer (molecular weight: 1600) was mixed with 5.4 g of the polyethyleneoxyglycol (molecular weight: 600). The mixture was dropped on a glass substrate and heated in an oven at 100° C. under nitrogen stream. After 30 hours, the mixture was cooled down to room temperature, immersed into methanol and dried. A thin membrane of the styrene-maleic acid polyethyleneoxy ester crosslinked copolymer of an excellent adhesive strength and mechanical strength was prepared.

EXAMPLE 16

2.2 g of the styrene-maleic anhydride polymer (molecular weight: 1600) was mixed with 3.3 g of the polyethyleneglycol (molecular weight: 600) and 7.8 g of polyethyleneglycol monomethyl ether (molecular weight: 750). The mixture was dropped on an aluminum plate and heated in an oven at 100° C. under nitrogen stream. After 30 hours, the mixture was cooled down to room temperature, immersed into methanol and dried. An ion-conducting thin membrane of styrene-maleic acid polyethyleneoxy ester crosslinked copolymer of an excellent adhesive strength and mechanical strength was prepared.

EXAMPLE 17

0.09 g of styrene-maleic acid polyethyleneoxy ester copolymer of prepared in Example 1 was dissolved in 2 mL of acetonitrile, to which 0.02 g of lithium trifluoromethane sulfonate salt was added. By dropping the above solution on an ion-conducting glass electrode and drying the solvent in a reduced pressure, a colorless transparent ion-conducting polymer thin membrane was prepared. The measurement result of a thermal analyzer indicates that the above thin membrane has a glass transition temperature of −26.5° C. and is non-crystalline.

Ion conductivity experiment

The ion conductivity was measured after applying the copolymer composition on an ion-conducting glass electrode and being dried. The conductivity was obtained by measuring the AC impedance of the gap of electrodes, analyzing the measured values by a frequency response analyzer and using an analysis method of complex impedance.

The ion conductivity of the copolymer thin solid electrolyte of Example 17 was $5 \times 10^{-4}$ S/cm at room temperature.

EXAMPLES 18 TO 34

The copolymer was prepared in the same manner as in Example 17, except that the amount of each reaction component shown in Table 2 below is used. The ion conductivity at room temperature of the polymer thin membrane prepared was measured and reported in Table 2 below.

TABLE 2

| example | compositions of ion-conducting thin membrane | | lithium tri-fluoromethane sulfonate salt (g) | mole ratio (O/Li) | glass transition temperature (Tg) (° C.) | ion conductivity at room temperature δ (S/cm$^{-1}$) |
|---|---|---|---|---|---|---|
| | styrene-maleic acid polyethyleneoxy ester copolymer | | | | | |
| | copolymer | (g) | | | | |
| 18 | example 1 | 0.12 | 0.015 | 21 | −31.4 | 6.9 × 10$^{-3}$ |
| 19 | example 1 | 0.10 | 0.03 | 8 | −22.3 | 4.1 × 10$^{-4}$ |
| 20 | example 2 | 0.10 | 0.26 | 11 | −11.6 | 1.7 × 10$^{-4}$ |
| 21 | example 3 | 0.090 | 0.019 | 11 | −2.3 | 2.0 × 10$^{-4}$ |
| 22 | example 4 | 0.12 | 0.016 | 21 | −11.6 | 2.3 × 10$^{-3}$ |
| 23 | example 5 | 0.10 | 0.30 | 11 | −18.6 | 3.7 × 10$^{-4}$ |
| 24 | example 5 | 0.11 | 0.021 | 16 | −31.6 | 2.7 × 10$^{-4}$ |
| 25 | example 5 | 0.11 | 0.018 | 27 | −26.8 | 4.9 × 10$^{-4}$ |
| 26 | example 6 | 0.11 | 0.033 | 11 | −37.8 | 1.7 × 10$^{-4}$ |
| 27 | example 6 | 0.14 | 0.021 | 22 | −31.1 | 4.9 × 10$^{-4}$ |
| 28 | example 7 | 0.12 | 0.028 | 11 | — | 7.8 × 10$^{-4}$ |
| 29 | example 7 | 0.17 | 0.021 | 21 | — | 2.5 × 10$^{-4}$ |
| 30 | example 8 | 0.20 | 0.057 | 11 | — | 5.4 × 10$^{-4}$ |
| 31 | example 8 | 0.20 | 0.035 | 19 | — | 3.2 × 10$^{-4}$ |
| 32 | example 9 | 0.19 | 0.059 | 10 | — | 2.1 × 10$^{-4}$ |
| 33 | example 9 | 0.20 | 0.034 | 19 | — | 2.6 × 10$^{-4}$ |
| 34 | example 10 | 0.24 | 0.036 | 11 | — | 1.1 × 10$^{-4}$ |

EXAMPLE 35

An ion-conducting thin membrane was prepared by immersing the polymer thin membrane prepared as in the above Example 15 in 0.11 M solution of lithium hexafluorophosphonium salt for 48 hours which was then dried. The ion conductivity of the ion-conducting thin membrane prepared as above was 3×10$^{-7}$ S/cm at room temperature.

EXAMPLE 36

An ion-conducting thin membrane was prepared by immersing the polymer thin membrane prepared as in the above Example 16 in 0.11 M solution of lithiumtrifluoromethane sulfonate salt for 48 hours which was then dried. The ion conductivity of the polymer thin membrane prepared as above was 3×10$^{-4}$ S/cm at room temperature.

EXAMPLE 37

In Example 16, the ion-conducting polymer thin membrane was prepared by adding 0.2 g of polyvinylidene fluoride in the electrolyte mixture, which was dried after coating. The ion conductivity of the polymer thin membrane prepared as above was 3×10$^{-4}$ S/cm at room temperature.

EXAMPLE 38

0.5 g of the styrene-maleic anhydride polymer (molecular weight: 1600) was mixed with 1.5 g of polyethyleneoxyglycol (molecular weight: 600) and 0.5 g of lithium trifluoromethane sulfonate salt. The mixture was dropped on an ion-conducting glass electrode and heated in an oven at 100° C. under nitrogen stream. After 30 hours, the mixture was cooled to room temperature and immersed in methanol and dried. A thin membrane of styrene-maleic acid polyethyleneoxy ester copolymer of an excellent adhesive strength and mechanical strength was prepared. The ion conductivity of the polymer thin membrane prepared as above was 7×10$^{-7}$ S/cm at room temperature.

What is claimed is:

1. A composition for an ion-conducting thin membrane, prepared by mixing 1 to 50% by weight of a styrene-maleic acid polyethyleneoxy ester copolymer of formula (1), 1 to 50% by weight of an electrolytic salt chosen from the group consisting of compounds of formula (3), and 50 to 98% by weight of an organic solvent chosen from acetonitrile and propylene carbonate,

[chemical formula 1]

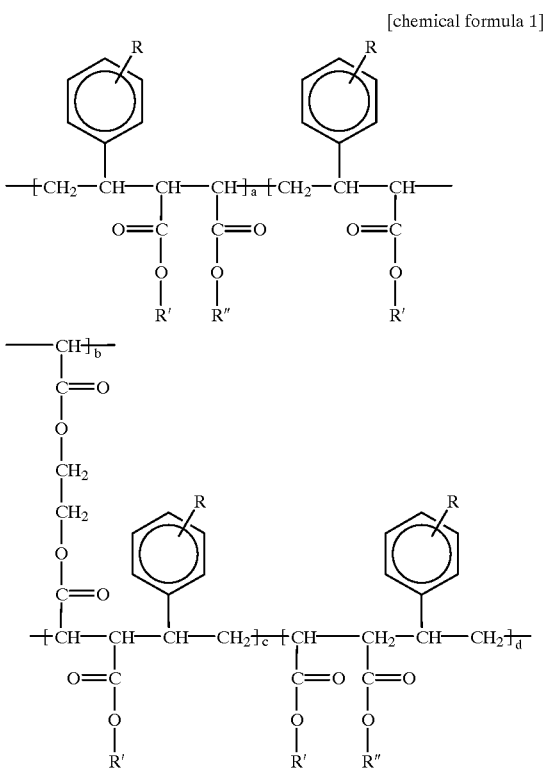

wherein R represents hydrogen, a lower alkyl group having no more than 10 carbon atoms, or a phenyl group; a, b, c, d has a value of 0 to 1 where a+b+c+d=1, and R' may be R or R" where R" represents a polyalkyleneoxy alkyl ether of formula (2),

[chemical formula 2]

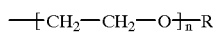

wherein n is an integer of 1 to 20 and R is the same as defined above $A^+B^-$  [chemical formula 3]

wherein $A^+$ represents a cation which may be Li or Na and $B^-$ represents an anion which may be $ClO_4^-$, $CF_3SO_3^-$, $N(CF_3SO_3)_2^-$, $BF_4^-$, $PF_6^-$, or $AsF_6^-$.

2. The composition of the ion-conducting thin membrane according to claim 1, wherein at least one of the compounds chosen from the group consisting of carbon black, natural graphite, artificial graphite, ethylene-propylene-diene rubber (EPDM) and polyvinylidene fluoride (PVdF) is mixed additionally.

3. An ion-conducting thin membrane of ion conductivity $10^{-2}\sim10^{-8}$ S/cm at room temperature, which is prepared by coating the composition of the ion-conducting thin membrane of claim 1 on an electrode or substrate by a solution processing step, such as spin coating, casting, dip coating or bar coating and then evaporating the solvent.

4. An ion-conducting thin membrane of ion conductivity $10^{-2}\sim10^{-8}$ S/cm at room temperature, which is prepared by coating the composition of the ion-conducting thin membrane of claim 2 on an electrode or substrate by a solution processing step, such as spin coating, casting, dip coating or bar coating and then evaporating the solvent.

5. The ion-conducting thin membrane according to claim 3, which is prepared by further addition of a plasticizer, viscosity builder and hardening agent or other ion-conducting polymer.

6. The ion-conducting thin membrane according to claim 4, which is prepared by further addition of a plasticizer, viscosity builder and hardening agent or other ion-conducting polymer.

7. The ion-conducting thin membrane according to claim 3, which is prepared by mixing additionally at least one of the compounds chosen from the group consisting of carbon black, natural graphite, artificial graphite, ethylene-propylene-diene rubber (EPDM) and polyvinylidene fluoride (PVdF).

8. The ion-conducting thin membrane according to claim 4, which is prepared by mixing additionally at least one of the compounds chosen from the group consisting of carbon black, natural graphite, artificial graphite, ethylene-propylene-diene rubber (EPDM) and polyvinylidene fluoride (PVdF).

9. A solid electrochemical material containing a styrene-maleic acid polyethyleneoxy ester copolymer of a molecular weight of 1,200 to 500,000 having formula (1), which is prepared by a reaction of a styrene-maleic anhydride polymer of a number-average molecular weight of from 1,000 to 100,000, polyethyleneglycol of a molecular weight of 200 to 5,000 and polyethyleneglycol monoalkyl ether of a molecular weight of 200 to 5,000 in the presence or absence of a solvent, and still optionally at least electrolytic salt of formula (3),

[chemical formula 1]

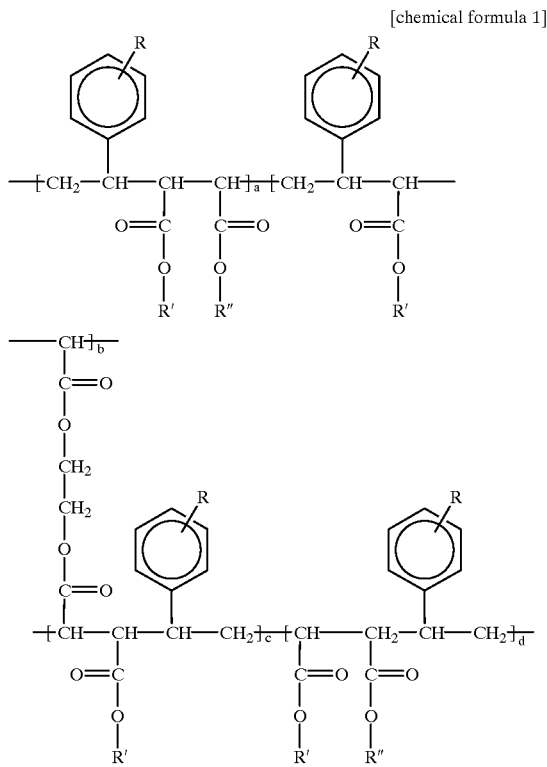

wherein R represents hydrogen, a lower alkyl group having no more than 10 carbon atoms, or a phenyl group; a, b, c, d has a value of 0 to 1 where a+b+c+d=1, and R' may be R or R" where R" represents a polyalkyleneoxy alkyl ether of formula (2)

[chemical formula 2]

wherein n is an integer of 1 to 20 and R is the same as defined above, $A^+B^-$  [chemical formula 3]

wherein $A^+$ represents a cation of Li or Na and $B^-$ represents an anion which may be $ClO_4^-$, $CF_3SO^-_3$, $N(CF_3SO_3)_2^-$, $BF_4^-$, $PF_6^-$, or $AsF_6^-$.

* * * * *

UNITED STATES PATENT AND TRADEMARK OFFICE
CERTIFICATE OF CORRECTION

PATENT NO. : 6,123,875
DATED : September 26, 2000
INVENTOR(S) : Kim et al.

It is certified that error appears in the above-identified patent and that said Letters Patent is hereby corrected as shown below:

In column 5, at line 64, delete "50" and insert --50%--.

Signed and Sealed this

Fifteenth Day of May, 2001

Attest:

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO. : 6,123,875
DATED : September 26, 2000
INVENTOR(S) : Kim et al.

It is certified that error appears in the above-identified patent and that said Letters Patent is hereby corrected as shown below:

Column 5,
Line 64, delete "50" and insert -- 50% --.

Signed and Sealed this

Fifth Day of October, 2004

JON W. DUDAS
*Director of the United States Patent and Trademark Office*